US006157782A

United States Patent [19]
Aoyama

[11] Patent Number: 6,157,782
[45] Date of Patent: Dec. 5, 2000

[54] OPTICAL APPARATUS WITH FOCUS ADJUSTING FUNCTION AND FOCUS ADJUSTMENT CONTROL CIRCUIT

[75] Inventor: Keisuke Aoyama, Kawasaki, Japan

[73] Assignee: Canon Kabushiki Kaisha, Tokyo, Japan

[21] Appl. No.: 09/494,922

[22] Filed: Feb. 1, 2000

Related U.S. Application Data

[62] Division of application No. 09/217,552, Dec. 21, 1998.

[30] Foreign Application Priority Data

Dec. 24, 1997 [JP] Japan ................................. 9-365959
Dec. 26, 1997 [JP] Japan ................................. 9-366898

[51] Int. Cl.⁷ .................................................. G03B 13/36
[52] U.S. Cl. ......................................... 396/104; 396/123
[58] Field of Search ................................ 396/121, 122, 396/123, 104

[56] References Cited

U.S. PATENT DOCUMENTS

| | | | |
|---|---|---|---|
| 4,749,848 | 6/1988 | Sorimachi | 250/201 |
| 4,827,303 | 5/1989 | Tsuboi | 354/403 |
| 4,943,824 | 7/1990 | Nabeshima et al. | 396/123 |
| 4,980,716 | 12/1990 | Suzuki et al. | 354/403 |
| 4,992,817 | 2/1991 | Aoyama et al. | 354/403 |
| 4,994,843 | 2/1991 | Kitazawa | 354/409 |
| 5,005,041 | 4/1991 | Suda et al. | 354/407 |
| 5,091,742 | 2/1992 | Fukahori et al. | 354/402 |
| 5,121,151 | 6/1992 | Kawabata et al. | 354/402 |
| 5,138,358 | 8/1992 | Aoyama et al. | 354/403 |
| 5,307,112 | 4/1994 | Aoyama | 354/406 |
| 5,311,241 | 5/1994 | Akashi et al. | 354/402 |
| 5,361,119 | 11/1994 | Shida et al. | 354/409 |
| 5,410,383 | 4/1995 | Kusaka et al. | 396/123 |
| 5,473,403 | 12/1995 | Suda et al. | 354/409 |
| 5,568,222 | 10/1996 | Aoyama | 396/123 |
| 5,604,562 | 2/1997 | Aoyama | 396/79 |
| 5,615,398 | 3/1997 | Matsuyama | 396/77 |
| 5,737,642 | 4/1998 | Aoyama | 396/51 |
| 5,887,200 | 3/1999 | Aoyama | 396/50 |
| 5,890,021 | 3/1999 | Onoda | 396/121 |
| 5,913,082 | 6/1999 | Onoda | 396/128 |

FOREIGN PATENT DOCUMENTS

| | | |
|---|---|---|
| 7-134237 | 5/1995 | Japan . |
| 7-134238 | 5/1995 | Japan . |
| 8-286253 | 11/1996 | Japan . |
| 9-127405 | 5/1997 | Japan . |
| 9-211316 | 8/1997 | Japan . |
| 10-161013 | 6/1998 | Japan . |

Primary Examiner—W. B. Perkey
Attorney, Agent, or Firm—Fitzpatrick, Cella, Harper & Scinto

[57] ABSTRACT

An optical apparatus having a focus adjusting function, including: a focus detection unit for executing a focus detection operation for each of a plurality of focus areas set in an image plane; a grouping unit for grouping the image plane in accordance with a distribution of defocus amounts or distances obtained from focus detection results of the plurality of focus areas; a focus area selecting unit for selecting at least one focus area from the plurality of focus areas in accordance with a grouping result; a defocus amount comparing unit for comparing a defocus amount of the selected focus area selected with a predetermined defocus amount; a lens driving unit for driving a lens until the selected focus area is made in-focus, if a comparison result by the defocus amount comparing unit shows that the defocus amount of the selected focus area is smaller than the predetermined defocus amount; and a focus area re-selecting unit for re-selecting a focus area by driving the lens in accordance with the defocus amount of the selected focus area and thereafter again operating the focus detecting unit, the grouping unit, and the focus area selecting unit, if a comparison result by the defocus amount comparing unit shows that the defocus amount of the selected focus area is larger than the predetermined defocus amount.

6 Claims, 17 Drawing Sheets

| | | | | | | | | | | | |
|---|---|---|---|---|---|---|---|---|---|---|---|
| | | | | | | | | | | | |
| | | | | 1.5 | 1.5 | | | 7.0 | | 5.0 | |
| 1.0 | | | | 1.5 | 1.5 | | 11.0 | 7.0 | 7.0 | 1.5 | 1.2 |
| 1.0 | 2.0 | | 1.5 | 1.5 | 1.5 | | 11.0 | 4.0 | 2.0 | 1.5 | 1.2 |
| 1.0 | 2.0 | 4.0 | | 1.5 | 1.5 | | 9.0 | 4.0 | 2.0 | 1.5 | 1.2 |
| 1.0 | 2.0 | 4.0 | | 1.5 | 1.5 | | 9.0 | 4.0 | 2.0 | 1.5 | 1.2 |
| 1.0 | 2.0 | 4.0 | | 1.5 | 1.5 | | 9.0 | 4.0 | 2.0 | 1.5 | 1.2 |
| 1.0 | 2.0 | | 1.5 | 1.5 | 1.5 | 1.5 | | 4.0 | 2.0 | 1.5 | 1.2 | b3,b5
c2,c4,c6
d1,d3,d5 a14,a16,
b15,b17,
c16,
d15,d17

AAR
b3 b5,b9,
c4,c6,c8,c10,
d1,d3,d5,d7,
d9,d11 a4 a6
b5 b7
c4 c6
d3 d5
b3
b1 c0 c2 d1

OPTICAL APPARATUS WITH FOCUS ADJUSTING FUNCTION AND FOCUS ADJUSTMENT CONTROL CIRCUIT

This application is a division of application Ser. No. 09/217,552 filed Dec. 21, 1998.

BACKGROUND OF THE INVENTION

1. Field of the Invention

The present invention relates to an optical apparatus having a focus adjusting function capable of detecting the focus in each of a plurality of areas in an image plane, and to a focus adjustment control circuit.

2. Related Background Art

In the case of a camera which can detect a focus in, or measure a distance to, each of a plurality of focussing areas, if a lens is driven in accordance with the focus or distance of an object in the focus area at the nearest distance determined from a plurality of focus detecting or distance measuring results, a correct auto focussing operation is often impossible. To solve this problem, an algorithm is disclosed in U.S. Pat. No. 5,121,151 in which, for example, if the focus detecting or distance measuring results of three points show a specific pattern such as "far", "middle", and "near", the focus area of "middle" is selected (because "near" may be the ground).

Another apparatus is disclosed in U.S. Pat. No. 4,749,848 which can detect a defocus amount in, or measure a distance to, an arbitrary point in an image space by detecting a focus in, or measuring a distance to, each of a number of focus areas in an image plane.

This proposed apparatus will be described by taking as an example photographing a scene, such as is shown in FIG. 6.

An image plane is divided into fine blocks (sets of a plurality of pixels on an area sensor), and the distance to or the focus of each block is measured to obtain distance distribution information or defocus amount information, such as shown in FIG. 7. Objects constituting the image space are grouped in order to determine the object layout in the image space.

FIG. 8 shows an example of the results of grouping performed in accordance with the distribution data shown in FIG. 7. Grouping defines the area of each object. Several practical grouping methods are known. An example of the simplest method is to judge that two adjacent blocks constitute the same object if the difference of the distance or the defocus between the two blocks is a predetermined value or smaller. This judgement is performed for each of adjacent two blocks.

By using a grouping method, the focus areas are grouped for each object constituting the image space such as is shown in FIG. 8.

The area of a main object among the objects constituting the image space is determined in accordance with, for example, distance information (or defocus amount information), size information of each object, position information of each object in the image plane, and the inclination extent of each object or the like.

Another grouping method uses a histogram of distance distribution (or defocus amount distribution). Several focussing methods are also used. In one method, attention is paid only to the nearest object and the most frequently occurring distance. If the distance difference therebetween is very small, the middle area between the two objects is focussed, whereas if not, the front object is focussed.

However, in a practical auto focussing operation, focus detection or distance measurement is not always performed correctly for all focus areas, and the distance distribution (or defocus amount distribution) changes with an error of the distance measurement (or focus detection) and with a fine motion of a photographer or an object during auto focussing. Furthermore, with a TTL (through the (taking) lens) type focus detection system, a stop position of a taking lens, when the focus is detected, may greatly influence the detected focus. Particularly, when a distance distribution (or defocus amount distribution) is repetitively measured during focus adjustment, the obtained distance distribution (or defocus amount distribution) changes minutely each time it is measured. Although this phenomenon poses no practical problem if the objects are spaced apart from each other such as shown in FIG. 6, it becomes conspicuous if objects are near to each other or a distance of a main object from the background is short.

FIG. 9A shows an example of such a scene wherein two persons stand side by side just in front of a wall. FIG. 9B shows a focus detecting area (or distance measuring area) of focus detecting means for adjusting the focus of this scene. FIGS. 10A to 10D show defocus maps representing defocus distributions measured with such a focus detecting system.

FIG. 10A shows an example of a division into four groups. Groups A1 and A2 are approximately the groups of the left person shown in FIG. 9A, and groups A3 and A4 are the groups of the right person shown in FIG. 9A. In this case, most of the background wall is recognized as a group from which focusses are not detected (in FIG. 10A, blank blocks). FIG. 10B shows an example in which the persons are correctly discriminated as groups B1 and B2. In FIG. 10C, the two persons are recognized as one group C3, and the wall and part of the persons are recognized as other groups (refer to groups C1 and C2). In FIG. 10D, the two persons and part of the wall are recognized as the same group D2, and only part of the persons is recognized as another group D1.

As above, even if the same scene is photographed, the distance distribution (or defocus amount distribution) becomes very different depending upon the position of a taking lens and an enabled/disabled state of focus detection.

If the focus adjustment is performed by repetitively determining a focus area from such different distance distributions (or defocus amount distributions), the focus area cannot be determined. Therefore, hunching or the like may occur or the focus area changes each time the focus adjustment is performed, so that the photographer loses confidence in the camera.

Some conventional cameras of the type that a focus of each of a plurality of focus areas in an image plane can be detected, display the focus detection results. For example, in Japanese Patent Application Laid-Open No. 8-286253, the positions of all focus detectable areas and an in-focus state of each area can be visually recognized at once by changing the color of each segment of a display.

However, with Japanese Patent Application Laid-Open No. 8-286253, since color display is performed for all focus detectable areas, this color display is superposed upon objects so that the objects are hard to be visually recognized.

For example, if an area c10 shown in FIG. 18B is focussed, the distance measuring areas or focus detecting areas at the same distance also become in-focus. The color display is therefore made in these areas in the baby face. Although the in-focus area can be recognized, the object becomes hard to visually recognize and photographing is hindered. Also, the area actually focussed cannot be identified.

Furthermore, if in-focus states are displayed for all the distance measuring or focus detecting areas, the distance measuring or focus detecting areas of a further object at the same distance to the main object is also displayed as being in the in-focus state so that the photographer may think that the object different from the main object was focussed inadvertently.

For example, if the area b3 of a human face shown in FIG. 18A is focussed, the street lamp at the same distance is also in an in-focus state and an in-focus display is made. In this manner, if all the distance measuring or focus detecting areas in an in-focus state are displayed, the photographer cannot judge whether the person was focussed or the street lamp was focussed, or the photographer may erroneously judge that the street lamp was focussed.

SUMMARY OF THE INVENTION

One aspect of the invention is to provide an optical apparatus in which a focus detection operation is executed for each of a plurality of focus areas set in an image plane, the image plane is divided into groups and others in accordance with a distribution of defocus amounts or distances obtained from focus detection results of the plurality of focus areas, and at least one focus area is selected from the plurality of focus areas in accordance with a result of the division into groups and others, and the optical apparatus having a defocus amount comparing means for comparing a defocus amount of the selected focus area with a predetermined defocus amount. A lens is driven until the selected focus area is made in-focus, if a comparison result by the defocus amount comparing means shows that the defocus amount of the selected focus area is smaller than the predetermined defocus amount.

If a comparison result by the defocus amount comparing means shows that the defocus amount of the selected focus area is larger than the predetermined defocus amount, a focus area is re-selected, after the lens is driven in accordance with the defocus amount of the selected focus area by again executing the focus detecting, grouping, and focus area selecting operations.

BRIEF DESCRIPTION OF THE DRAWINGS

FIGS. 17A, 17B, 17C and 17D are diagrams illustrating focus areas of an auto focus camera and a display of in-focus states of the focus areas, according to the seventh embodiment.

DETAILED DESCRIPTION OF THE PREFERRED EMBODIMENTS

Embodiments of the invention will be described with reference to the accompanying drawings.
First Embodiment FIG. 3 is a block diagram showing the outline structure of a camera according to the first embodiment.

Figure 3:
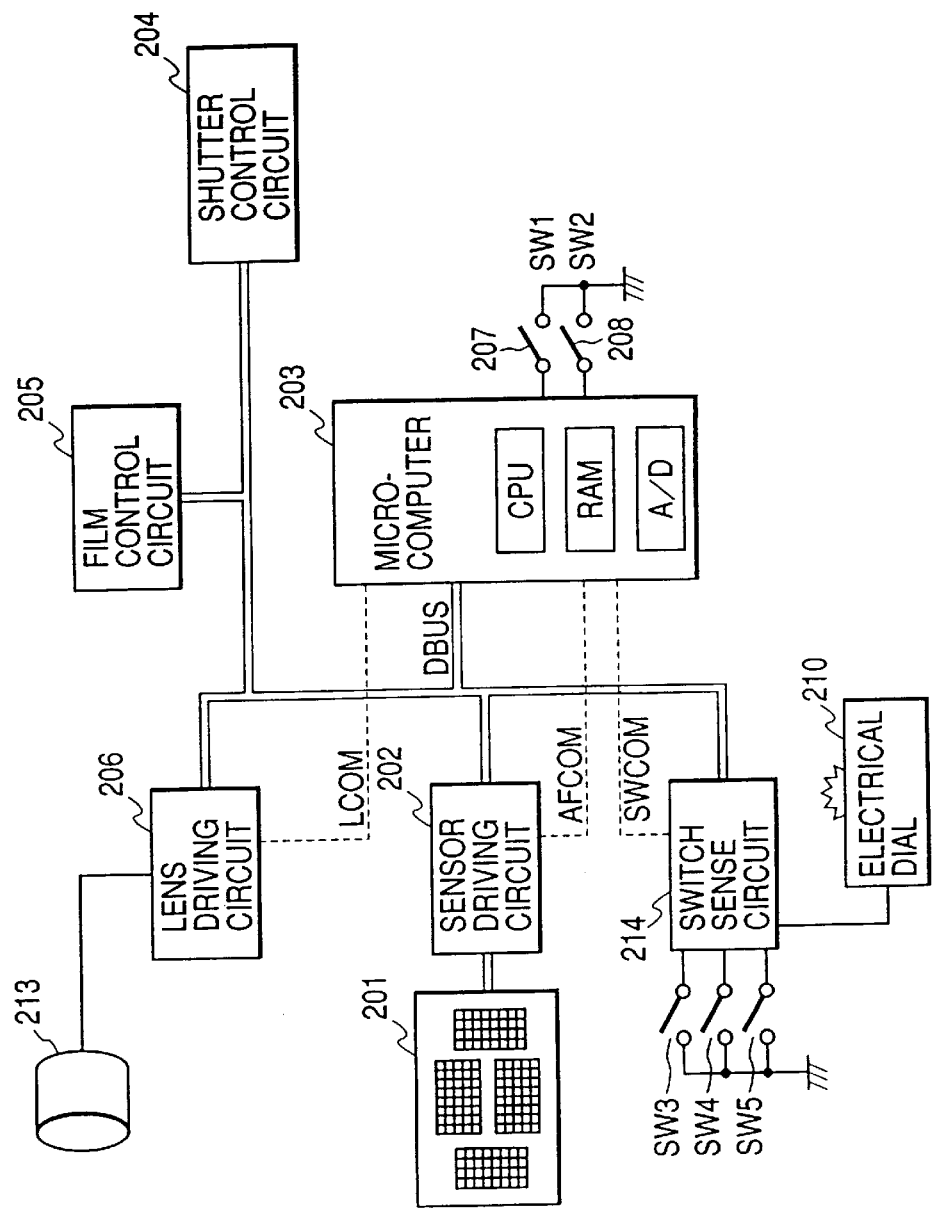
FIG. 3 is a block diagram showing the outline structure of a camera used by the first and second embodiments.

In FIG. 3, reference numeral 203 represents a microcomputer which includes an A/D convertor for converting an output from an area sensor to be described later into a digital signal, a memory (RAM) for storing an image signal A/D converted by the A/D converter, and a CPU which performs formulating of a defocus map representative of a defocus amount distribution, grouping, and the like.

Reference numeral 201 represents an area sensor, such as a CCD, having fine light reception elements disposed two-dimensionally, and reference numeral 202 represents a sensor driving circuit for driving the area sensor 201. The sensor driving circuit 202 performs serial communication via a data bus DBUS while it receives an AFCOM signal. In accordance with sensor drive information received from the microcomputer 203 over serial communication, the sensor driving circuit 202 drives the area sensor 201.

Reference numeral 206 represents a lens driving circuit which drives a taking lens 213 in accordance with defocus amount information selected by the microcomputer 203. In driving the taking lens 213, the lens driving circuit 206 controls drives of a focus adjusting motor and an aperture vane control motor both provided for the taking lens 213. The lens driving circuit 206 performs serial communication via the data bus DBUS while it receives an LCOM signal from the microcomputer 203. In accordance with lens drive information supplied from the microcomputer 203 over serial communication, the lens driving circuit 206 controls the drive of the taking lens. At the same time, the lens driving circuit 206 supplies various information (such as focal length information) of the taking lens to the microcomputer 203 over serial communication.

Reference numeral 207 represents a switch SW1 which turns on upon a first stroke of a release button, and reference numeral 208 represents a switch SW2 which turns on upon a second stroke of the release button.

Reference numeral 214 represents a switch sense circuit which senses the state of a switch operated upon by a photographer to set various photographing conditions and the state of a switch indicating a camera state, and supplies the sensed states to the microcomputer 203. The switch sense circuit 214 supplies switch data to the microcomputer 203 over serial communication via the data bus DBUS while it receives an SWCOM signal. The switch sense circuit 214 also counts up or down a dial value in accordance with a value input from an electrical dial 210, and sends the count to the microcomputer over serial communication via the data bus DBUS.

Reference numeral 204 represents a shutter control circuit which controls an open/close operation of the shutter, and reference numeral 205 represents a film control circuit for controlling the film feeding.

Next, a series of operations to be executed by the microcomputer 203 will be described with reference to the flow chart shown in FIG. 4.

At Step #300 the power is supplied to the camera upon depression of a main switch of the camera. Next, at Step #301 in accordance with information supplied from the switch sense circuit 214, a mode and a set value are switched. If there is any change, this change is supplied to an unrepresented liquid crystal display circuit to change display data and display color. At Step #302 it is checked whether the switch SW1 is on. If it is on, photometry is performed at Step #306, whereas if it is off, the flow advances to Step #303.

It is assumed herein that the switch SW1 is maintained off and the flow advances to Step #303.

If the switch SW1 is off at Step #302, it is checked at Step #303 whether the power is to be turned off. If not, the flow returns to Step #302 to check the switch SW1. Namely, after the power is turned on once in any of these cases, the power-on state is maintained for a predetermined period to check the switch state and change a display. If the power is to be turned off at Step #303, the power is turned off at Step #304 to make the liquid crystal display circuit erase unnecessary displays in the finder or on the outer frame of the camera. At Step #305, a series of operations are terminated.

If it is judged at Step #302 that the switch SW1 is on, the flow advances to Step #306 whereat a photometry circuit is activated to receive light reflected from an object and to A/D convert it to acquire photometry information. In accordance with the photometry information, the exposure conditions (aperture, shutter speed) are calculated. At Step #307 a sub-routine of an auto select AF (automatic focussing) is performed. The details of the operation of this sub-routine will be later described. At Step #308, the liquid crystal display circuit displays an AV value and a TV value acquired at Step #306 on a finder liquid crystal display and an external liquid crystal display.

At Step #309 it is checked whether the camera state permits a release. For example, if the AF mode is in a "one shot mode" and a focus detection result at Step #307 is in a "in-focus state", then the release is permitted to follow Step #310 to check the switch SW2, whereas if it is not in an "in-focus state", the flow returns to Step #301. After the flow returns to Step #301, a mode and the like is displayed if necessary to follow Step #302 to check the switch SW1. If the switch SW1 is on, photometry, focus detection (or distance measurement), and display are again performed (Steps #302, #306, #307, and #308), and at Step #309 it is checked again whether the camera state permits a release.

If it is permitted at Step #309, the flow advances to Step #310 whereat it is checked whether the switch SW2 is on. If it is on, the flow advances to Step #311 to take an image of the object, whereas if it is off, the flow returns to Steps #301 and #302 to check the switch SW1. If it is judged at Step #302 that the switch SW1 is on, photometry, focus detection (or distance measurement), and display are again performed (Steps #302, #306, #307, and #308).

If it is judged at Step #310 that the switch SW2 is on, the flow advances to Step #311 to take an image of the object. At this Step, a charge motor control circuit moves up a quick return mirror, and the lens driving circuit 206 supplies the aperture amount determined at Step #306 to stop down the aperture of the taking lens 213 so as to have a corresponding exposure amount. At Step #312 the shutter control circuit 204 controls the movement of the leading and trailing shutter curtains so as to set the TV amount determined at Step #306. At Step #313, a charge motor control circuit moves down the quick return mirror and at the same time charges the shutter to open the aperture which was stopped down at Step #306. At Step #314 the film control circuit 205 controls a feed motor to wind up the film.

A series of operations of the camera are completed as in the above manner.

In the operation sequence described above, an abnormal camera operation (such as film jamming) is omitted because it is not relevant to the present invention.

Figure 1:
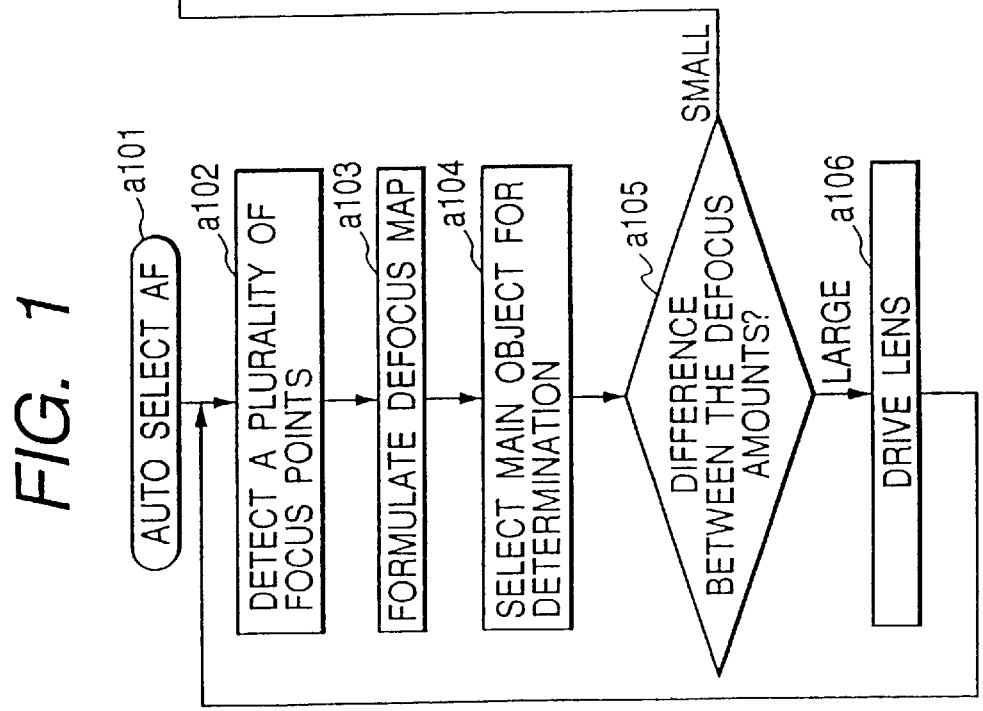
FIG. 1 is a flow chart illustrating the operation of an auto select AF sub-routine of a camera according to a first embodiment.

Next, the sub-routine "auto select AF" called at Step #307 in FIG. 4 will be detailed with reference to the flow chart of FIG. 1.

Figure 4:
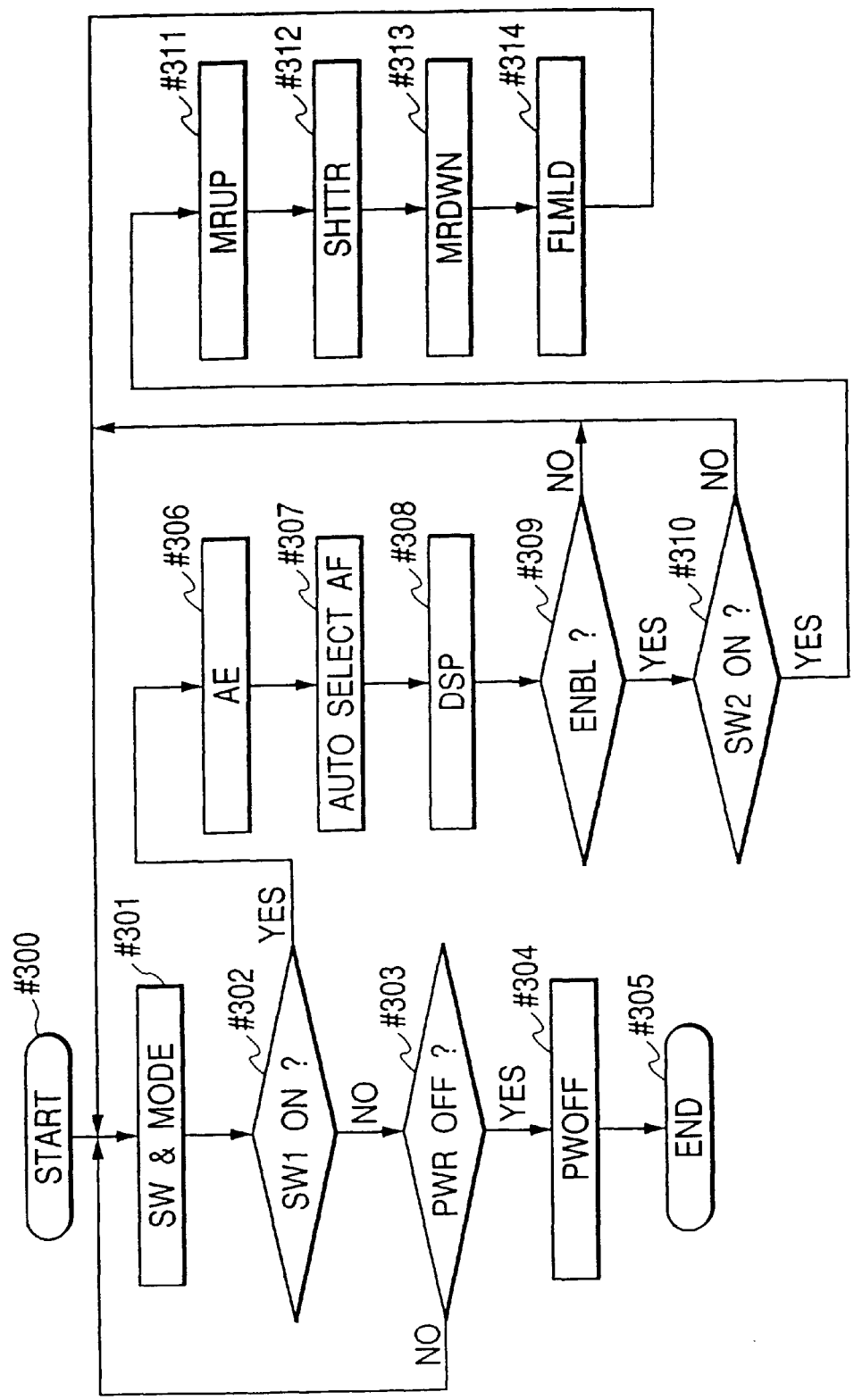
FIG. 4 is a flow chart illustrating the main operation of a camera used by the first and second embodiments.

After Step #306 shown in FIG. 4, the sub-routine auto select AF starts at Step a101. At Step a102 the sensor driving circuit 202 drives the area sensor 201 to accumulate charges in a photoelectric conversion sensor, store the output of the sensor, and A/D convert the output so that focus information in each of a plurality of focus areas are calculated. In accordance with the calculated focus information, defocus amounts of a plurality of focus areas are calculated by using a known algorithm.

At Step a103, in accordance with the calculated defocus amounts, grouping is performed (defocus map is formulated). As already described, in one of known grouping methods, it is judged that two adjacent blocks constitute the same object if the difference of distance or defocus between the two blocks is a predetermined value or smaller. This judgement is performed for each adjacent two blocks. The detailed description of such grouping methods is omitted because they are already known. With such judgement, it is possible to obtain a data grouping of an image plane for each object (group data obtained by using defocus amounts is called a defocus map).

Figure 5C:
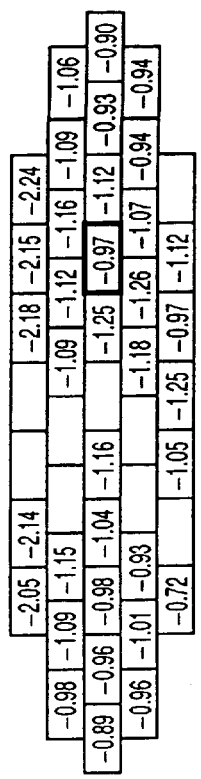
FIGS. 5A, 5B, 5C and 5D show defocus amounts detected by the auto select AF sub-routine and defocus maps in the first embodiment.
Figure 5D:
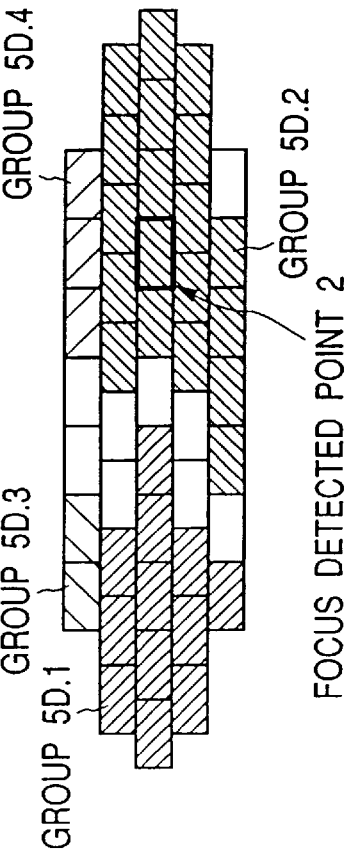
Figure 5A:
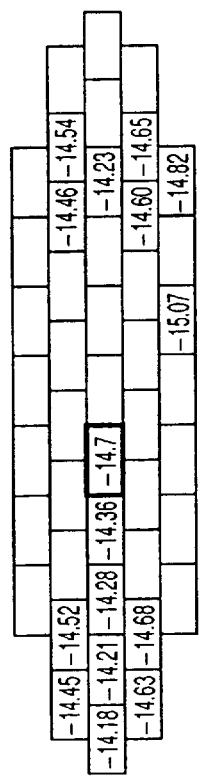
Figure 5B:
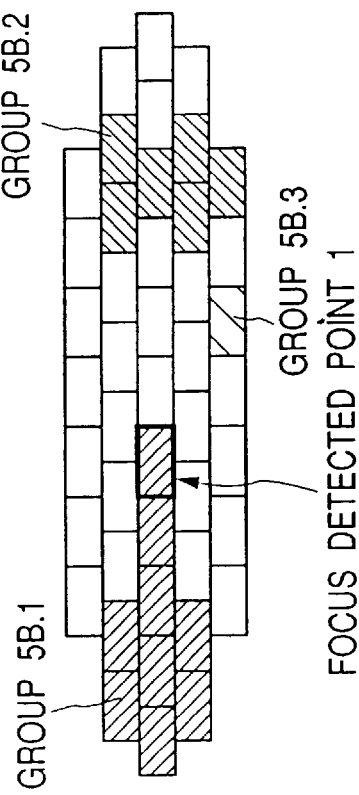
Figure 6:
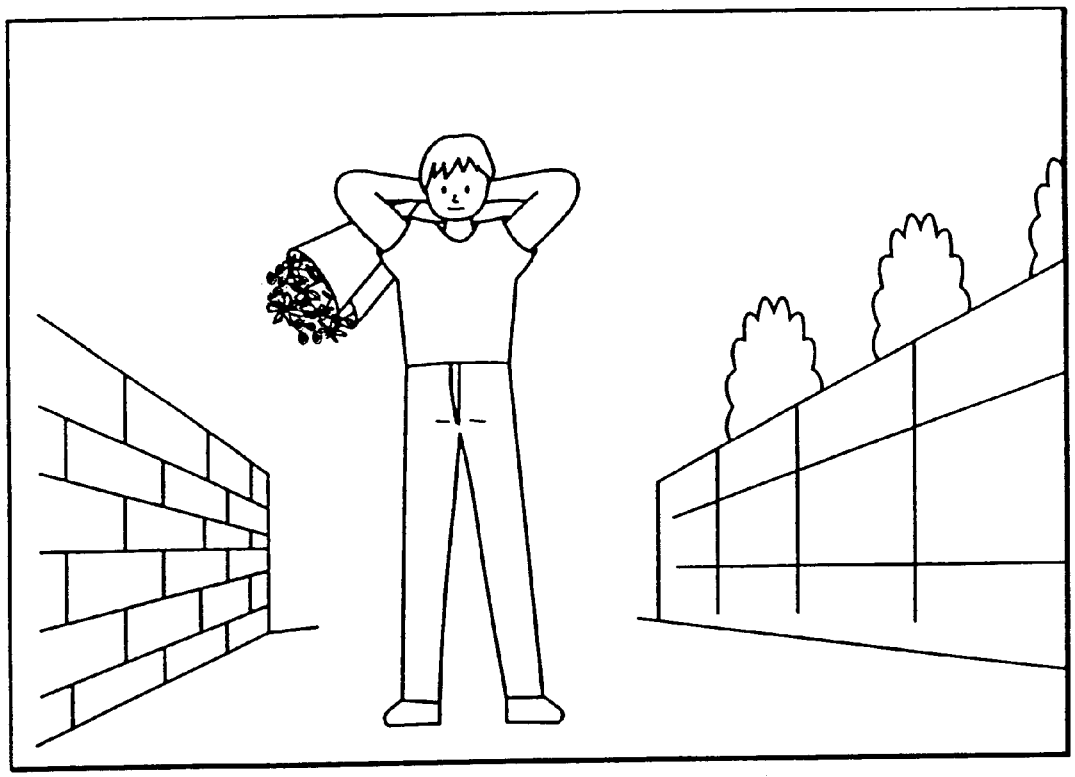
FIG. 6 shows an example of a scene used for illustrating a conventional technique.
Figures 7, 8:
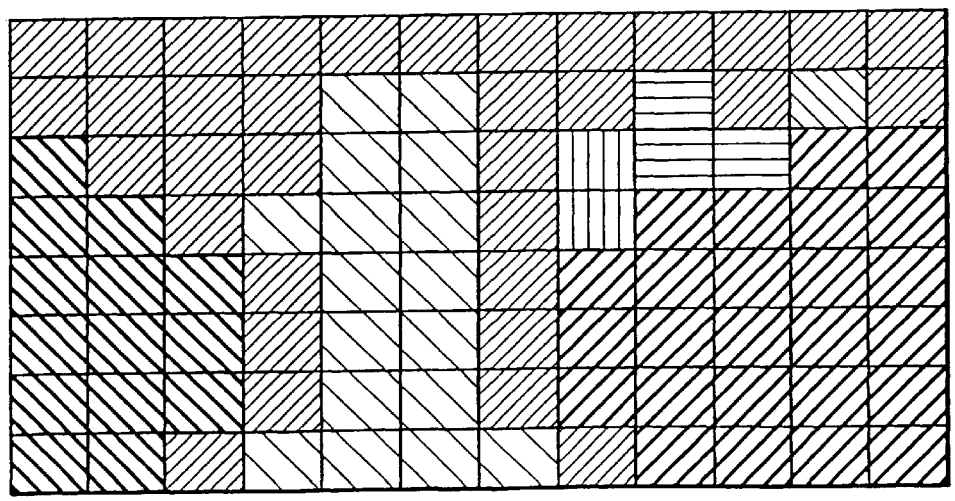
FIG. 7 is a diagram showing an example of distance distribution or defocus amount distribution.
FIG. 8 is a diagram showing an example of grouping focus areas shown in FIG. 7.
Figure 9A:
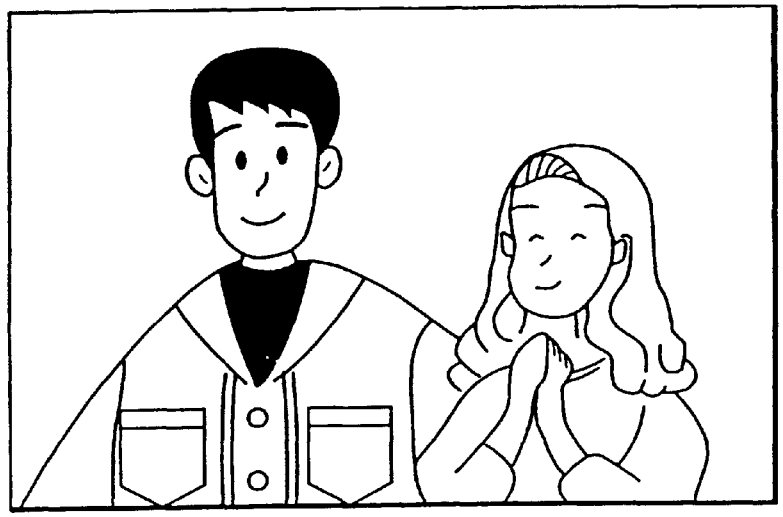
FIGS. 9A and 9B show an example of a photographed scene and a focus area distribution used for illustrating a conventional technique and the present invention.
Figure 9B:
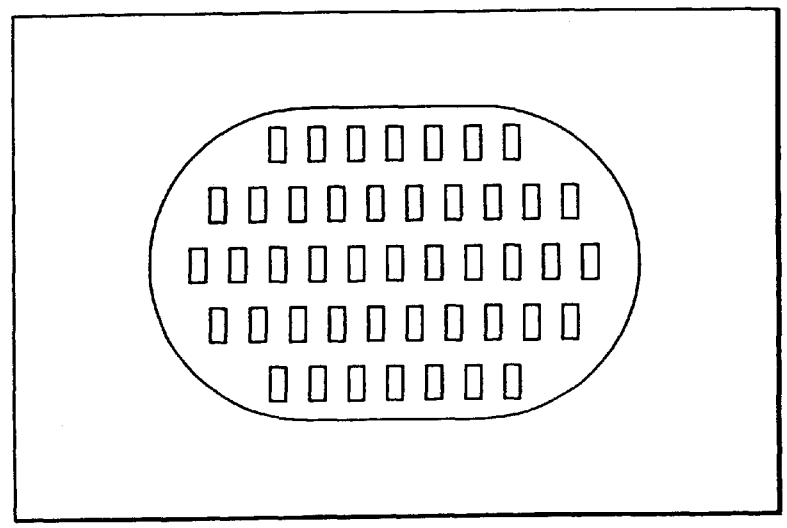
Figure 10A:
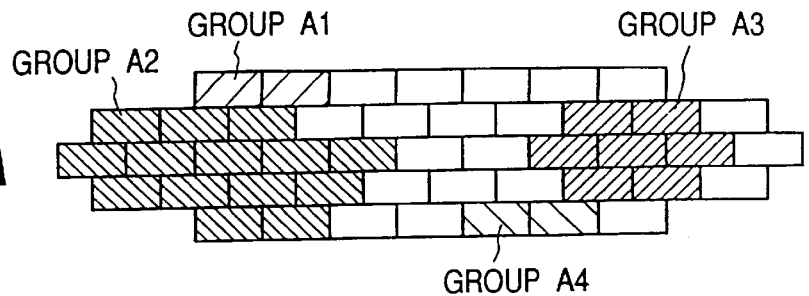
FIGS. 10A, 10B, 10C and 10D are diagrams showing examples of conventional defocus maps (focus area grouping).
Figure 10B:
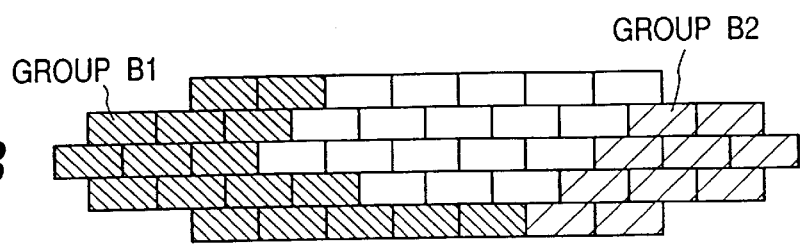
Figure 10C:
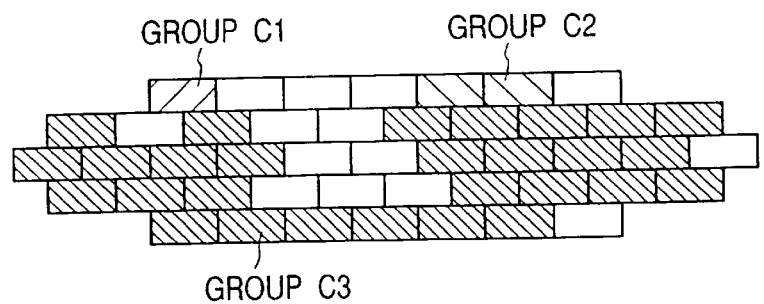
Figure 10D:
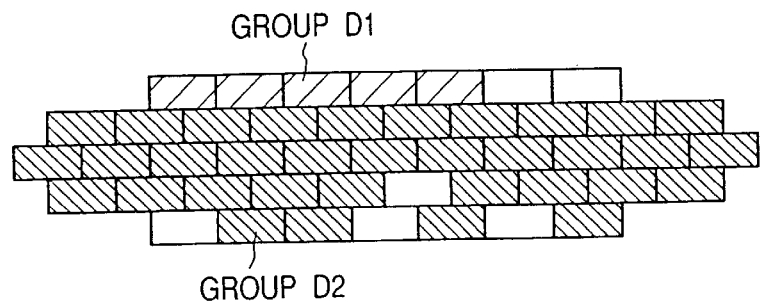

For example, in case that the lens is at the nearest position and a photographing scene is as shown in FIG. 9A, if the focus of each of the focus areas disposed as shown in FIG. 9B is detected, defocus amounts of the focus areas such as is shown in FIG. 5A are obtained (focus undetectable areas are shown as empty blocks). The defocus map formulated on the basis of these defocus amounts is shown in FIG. 5B. Since the lens is at the nearest position and the defocus amounts as to whole areas are large, there are many focus undetectable areas although the focuses of human faces with high contrast can be detected. The human faces are recognized as two groups 5B.1 and 5B.2 in the defocus map, and the clothes are recognized as one group 5B.3. The focuses cannot be detected in almost the whole area of the wall. The wall is therefore not recognized as a group.

At Step a104, a main object is selected from groups in the image plane. Factors for selecting the main object include the size and inclination of an object, the defocus amount, the position of an object in the image plane, and the like. After the main object is selected, a representative focus area of the group is determined. The defocus amount of the representative focus area is used as the defocus amount of the group.

In examples shown in FIGS. 5A and 5B, the group 5B.1 is selected as the main object from the groups 5B.1, 5B.2, and 5B.3. The defocus amount "−14.7" (absolute 14.7) of the focus area (as designated to "focus detected point 1 in FIG. 5B) in the group 5B.1 is selected as the defocus amount of the main object.

At Step a105 the defocus amount of the main object is compared with a defocus amount judgement threshold value. If the absolute value of the defocus amount of the main object is larger than the threshold value, the flow advances to Step a106, whereas if not, the flow branches to Step a107. If the defocus amount judgement threshold value is, for example, "1.0", the defocus amount "−14.7" (absolute value 14.7) is larger than the threshold value. The case wherein the defocus amount of the main object is larger than the threshold value will be first described. In this case, the flow advances to Step a106.

At Step a106, after the lens drive amount is calculated on the basis of the defocus amount of the main object, the lens drive amount is supplied to the lens control circuit 206 to drive the lens. After the lens is driven, the flow returns to Step a102 to again perform focus detection. The defocus map is again formulated at Steps a103 and a104 to select a main object and determine the defocus amount thereof.

In the foregoing example, after the lens is driven in accordance with the defocus amount of the previously selected main object and the focus detection is again performed, defocus amounts of focus areas such as is shown in FIG. 5C can be detected. The defocus map formulated in this case is shown in FIG. 5D. Since the lens is moved away from the nearest position, the defocus amounts of the previously selected main object are made smaller. The defocus map again formulated by using the newly detected defocus amount is shown in FIG. 5D. The human faces are recognized as two groups 5D.1 and 5D.2 in the defocus map, and a portion of one person forms one group 5D.3.

Since the focuses of the wall above the right side person can be detected at this time, a portion of the wall forms a new group 5D.4. The groups 5D.1 and 5D.2 correspond to the groups 5B.1 and 5B.2 of the defocus map formulated at the first focus detection. However, since the number of focus detectable areas increases, the size of each group is made slightly larger. As a group is selected from these four groups in accordance with a predetermined algorithm, the group 5D.2 is selected as the main object. The defocus amount of the representative focus area (as designated to "focus detected point 2 in FIG. 5D) of the group 5D.2 is used as the defocus amount of the main object.

At Step a105 the defocus amount is again compared with the threshold value, and if the defocus amount is larger than the threshold value, the flow advances to Step a106 to drive the lens.

As above, Steps a102 to a106 are repeated until the defocus amount becomes smaller than the judgement threshold value at Step a105, and the defocus map is formulated at each focus detection to select the main object.

If the defocus amount of the main object becomes smaller than the threshold value at Step a105, the flow branches to Step a107. In this example, since the defocus amount of the determined focus area 2 is "−0.97" (absolute value 0.97) which is smaller than the defocus amount judgement threshold value "1.0", the flow branches to Step a107 whereat the focus detected area is determined as the position finally calculated as the representative focus area in the main object at Step a104. After the above determination, the formulation of a defocus map and selection of the main object are not performed.

Namely, the focus detected point 2 is determined as the final position for focus detection, and only the focus detected point 2 is used thereafter for focus detection.

At Step a108 it is checked whether the defocus amount of the focus area or main object determined at Step a107 is in an in-focus range. If it is in an in-focus range, the flow advances to step a111, whereas if not, the flow advances to Step a109. At Step a109, a lens drive amount is calculated from the defocus amount of the main object determined at Step a107 and the lens drive amount is supplied to the lens driving circuit 206 to drive the lens. At Step a110 the focus of the focus area determined at Step a107 is detected to return to Step a108 to judge the in-focus range.

After the focus area (main object) is determined at Step a107, focus detection of only the determined focus area is repeated at Steps a108 to a110 until the in-focus range is established. As seen from the above description, once the main object is determined, a defocus map is not formulated and the main object is not selected.

If it is judged at Step a108 that the focus is in the in-focus range, the flow advances to Step a111 to set an "in-focus state" to thereafter follow Step a112 and return from this sub-routine.

In this sub-routine, focus detection is performed until the in-focus range is satisfied and the operation sequence not establishing the in-focus range is omitted. In practice, other processes are executed when the focus cannot be detected or when an in-focus range is not established after a predetermined number of lens driving operations. Therefore, the sub-routine is not always returned after the "in-focus state" is set.

As described so far, focuses of a plurality of focus areas are detected, the focus areas are grouped in accordance with the focus detection results, and the main object group is selected from divided groups to perform focus adjustment. In such a case, grouping and selection of the main object group are repeated to drive the lens until the defocus amount of the selected main object has a predetermined threshold value or a smaller value. After the defocus amount of the selected main object becomes the predetermined threshold value or smaller value, the selected main object is used as the finally determined main object, which is used for later focus adjustment. Accordingly, focus detection matching an intention of a photographer can be performed without hunching and erroneous selection of a main object.

Second Embodiment

Figure 2:
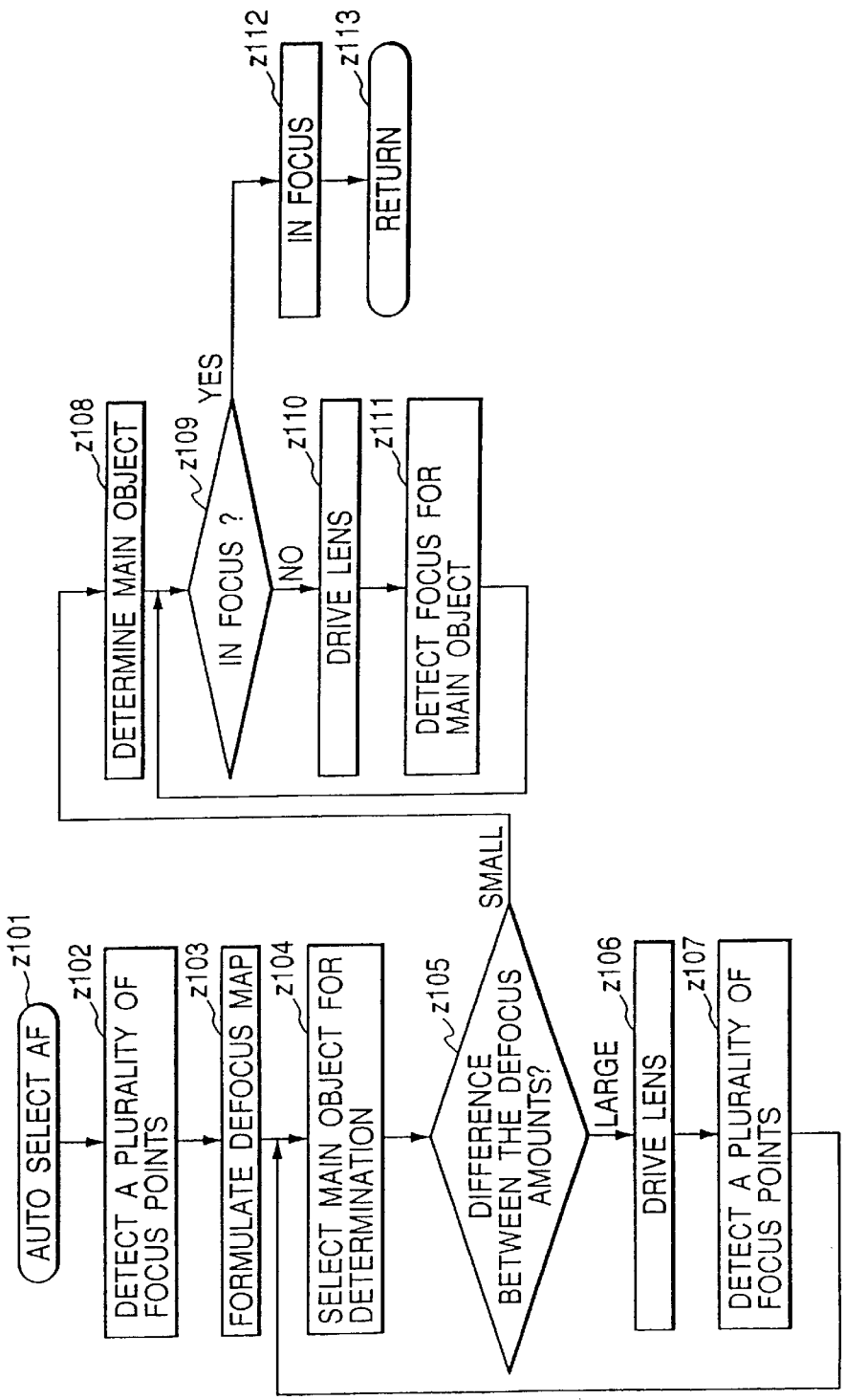
FIG. 2 is a flow chart illustrating the operation of an auto select AF sub-routine of a camera according to a second embodiment.

FIG. 2 is a flow chart illustrating a sub-routine "auto select AF" to be executed by a camera according to the second embodiment. The outline structure of the camera and other operations are similar to the first embodiment described with reference to FIGS. 3 and 4, and the description thereof is omitted.

When the sub-routine "auto select AF" is called at Step #307 shown in FIG. 4, this sub-routine starts at Step z101. At Step z102, the sensor driving circuit 202 drives the area sensor 201 to calculate defocus amounts of respective focus areas by using a known algorithm. In accordance with the calculated defocus amounts, the focus areas are grouped at Step z103. At Step z104, a main object is selected from groups in the image plane, and the focus area representative of the selected group is determined. The defocus amount of the determined focus area is used as the defocus amount of the selected group.

At Step z105 the defocus amount of the main object is compared with a defocus amount judgement threshold value. If the defocus amount of the main object is larger than the threshold value, the flow advances to Step z106, whereas if not, the flow branches to Step a108.

First, the operation to be executed when the defocus amount of the main object is larger than the threshold value and the flow advances to Step z106, will be described.

At Step z106, after a lens drive amount is calculated in accordance with the defocus amount of the main object, the lens control circuit 206 drives the lens in accordance with the supplied lens drive amount. After the lens is driven, focus detection is again performed for all the focus areas at Step z107 to return to Step z104 whereat the main object is again selected and the defocus amount of the selected main object is determined.

In the second embodiment, the defocus map is not formulated after it is once formulated, but the main object is selected by using the groups first divided. Since the defocus map is not formulated after it is once formulated, the calculation time can be shortened considerably, and the size and number of groups do not change each time the calculation is performed. When the focus areas are grouped the first time, they may be grouped roughly instead of strictly grouping the focus areas as in the first embodiment. Grouping the focus areas is not always determined on the basis of the first focus detection result, but it can be determined after several focus adjustment operations.

Steps z104 to z107 are repeated until the defocus amount becomes smaller than the threshold value at Step z105 to select the main object by using the groups first divided.

When the defocus amount of the main object becomes smaller than the threshold value at Step z105, the flow branches to step z108 whereat the focus area is determined as the position at which the area is finally calculated at Step z104. The main object is not selected thereafter. At Step z109 it is checked whether the defocus amount of the focus area determined at Step z108 is in an in-focus range. If it is in an in-focus range, the flow advances to Step z112, whereas if not, the flow advances to Step z110.

At Step z110, a lens drive amount is calculated from the defocus amount of the main object determined at Step z108 and the lens driving circuit 206 drives the lens in accordance with the supplied lens drive amount. After the lens is driven, at Step z111 the focus of the focus area determined at Step z108 is detected to return to Step z109 and judge the in-focus range.

After the focus area of the main object is determined at Step z108, focus detection of only the determined focus area is repeated at Steps z109 to z111 until the in-focus range is established. As seen from the above description, once the main object is determined, selecting a further main object is not performed.

If it is judged at Step z109 that the focus is in the in-focus range, the flow advances to Step z112 to set an "in-focus state" to follow Step z113 and return from this sub-routine.

In this sub-routine, the focus detection is performed until the in-focus range is satisfied and the operation sequence not establishing the in-focus range is omitted. In practice, other processes are executed when the focus cannot be detected or when an in-focus range is not established after a predetermined number of lens driving operations. Therefore, the sub-routine is not always returned after the "in-focus state" is set.

As described so far, focuses of a plurality of focus areas are detected, the focus areas are grouped in accordance with the focus detection results, and the main object group is selected from divided groups to perform focus adjustment. In such a case, selection of the main object group is repeated by using the groups once divided to thereafter drive the lens until the defocus amount of the selected main object has a predetermined threshold value or smaller. After the defocus amount of the selected main object becomes the predetermined threshold value or smaller value, the selected main object is used as the finally determined main object which is used for later focus adjustment. Accordingly, focus area matching an intention of a photographer can be selected without hunching and erroneous selection of an object. Furthermore, since grouping the focus areas is not repeated, the calculation amount becomes small and the calculation time can be shortened.

Third Embodiment

In the first embodiment, an apparatus of the type that detects defocuses is used. A range finder apparatus for measuring distance can be used for focus adjustment by performing similar focus area grouping. In this case, at a step corresponding to Step a103 shown in FIG. 1, a distance map is formulated, at a step corresponding to Step a105 a distance to the main object is compared with a distance of the in-focus area of the taking lens and at a further step it is judged that whether the difference therebetween is in a predetermined range.

Fourth Embodiment

In the second embodiment, an apparatus of the type that detects defocus amounts is used. A range finder apparatus for measuring a distance can be used for focus adjustment by performing similar sensor area grouping. In this case, at a step corresponding to Step z103 shown in FIG. 2, a distance map is formulated, at a step corresponding to Step z105 a distance of the main object is compared with a distance of the in-focus area of the taking lens and at a further step it is judged that whether the difference therebetween is in a predetermined range.

Fifth Embodiment

Figure 12:
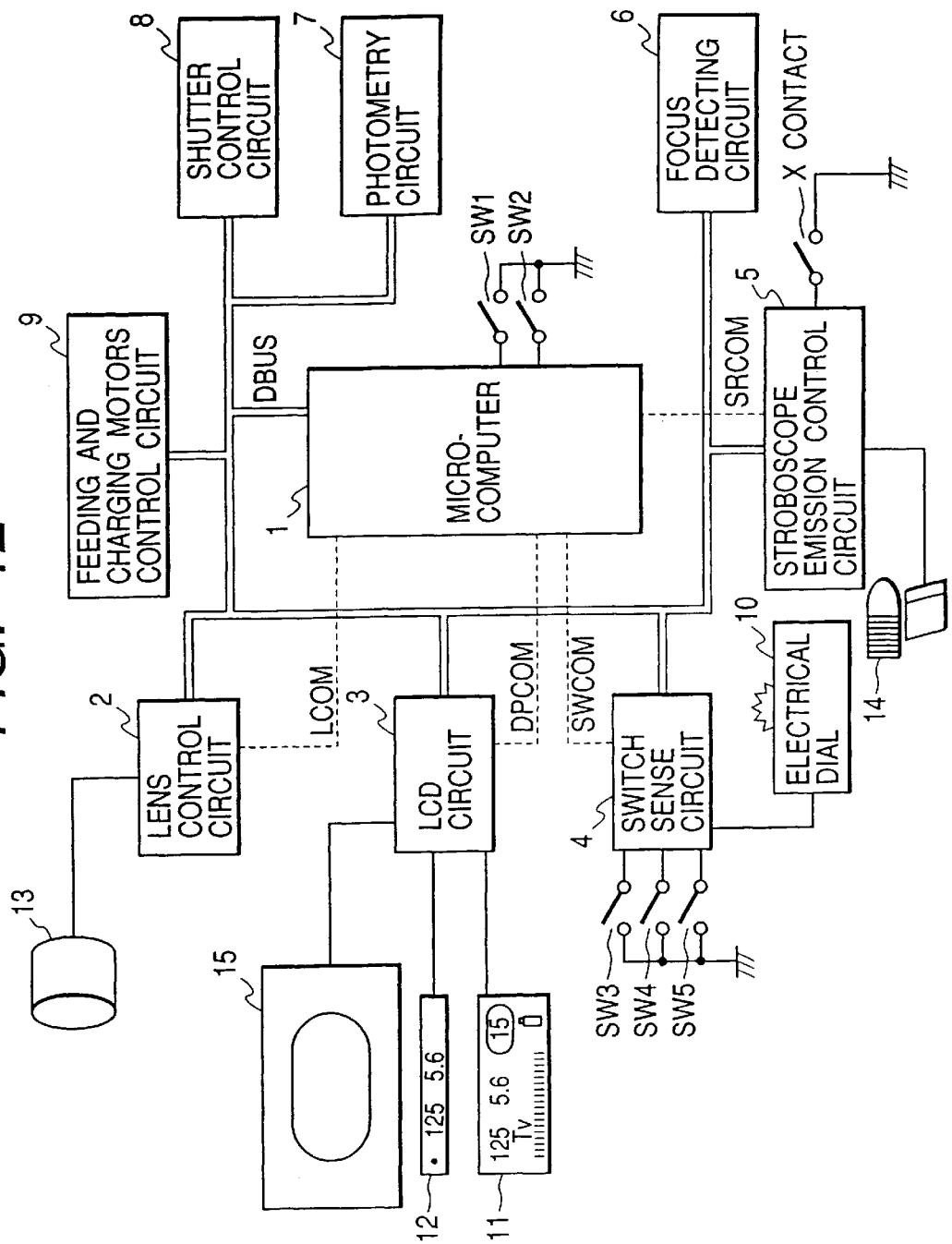
FIG. 12 is a block diagram showing the electrical configuration of an auto focus camera according to the fifth to seventh embodiment.

FIG. 12 is a block diagram showing the electrical configuration of an auto focus camera according to the fifth embodiment.

In FIG. 12, reference numeral 1 represents a microcomputer which controls the motion of each component of the camera. Reference numeral 2 represents a lens control circuit which controls a focus adjusting motor and an aperture vane control motor, both provided for a taking lens 13. The lens control circuit 2 performs serial communication via a data bus DBUS while it receives an LCOM signal from the microcomputer 1. In accordance with lens drive information supplied from the microcomputer 1 over serial communication, the lens control circuit 2 controls the drive of the taking lens. At the same time, the lens control circuit 2 supplies various information (such as focal length information) of the taking lens to the microcomputer 1 over serial communication.

Reference numeral 3 represents an LCD circuit which drives liquid crystal displays 11, 12, and 15 to be described later. The liquid crystal displays 11 and 12 notify a photographer of the camera battery remaining amount, the number of photographed scenes, a TV value, an AV value, an exposure correction value, an in-focus state, and the like. The liquid crystal display 15 is disposed on a focussing screen. The LCD circuit 3 performs serial communication via the data bus DBUS while it receives a DPCOM signal from the microcomputer 1. Upon reception of display data from the microcomputer 1 over serial communication, the LCD circuit 3 drives the liquid crystal displays 11, 12, and 15 in accordance with the display data supplied from the microcomputer 1.

Reference numeral 4 represents a switch sense circuit which senses the state of a switch used by a photographer to set various photographing conditions and the state of a switch indicating a camera state, and supplies the sensed states to the microcomputer 1. The switch sense circuit 4 supplies switch data to the microcomputer 1 over serial communication via the data bus DBUS while it receives an SWCOM signal. The switch sense circuit 4 also counts up or down a dial value in accordance with a value input from an electrical dial 10, and sends the count to the microcomputer 1 over serial communication via the data bus DBUS.

Reference numeral 5 represents a stroboscope emission control circuit which controls stroboscope emission and a light emission stop function through TTL light control. This stroboscope emission control circuit 5 performs serial communication with the microcomputer 1 via the data bus DBUS to receive stroboscope control data and performs various control operations while it receives an STCOM signal. This circuit 5 also functions as an interface with an external flash unit 14 when it is mounted on the camera. Therefore, when the flash unit 14 is mounted, the stroboscope emission control circuit 5 communicates with the external flash unit 14 and supplies the microcomputer 1 with information on whether any auxiliary flash unit is used, and conversely, it transfers a control signal from the microcomputer 1 to the external flash unit 14.

Reference numeral 6 rep resents a focus detecting circuit including photoelectrical conversion elements for performing focus detection through a known phase difference detection scheme and a circuit for reading accumulated charges. The focus detecting circuit 6 is controlled by the microcomputer 1.

The microcomputer 1 performs focus detection by using a known algorithm in accordance with A/D values of the sensor outputs of the focus detecting circuit 6, calculates a lens drive amount, and supplies the calculated lens drive amount to the lens control circuit 2 to drive the lens in an in-focus state. After the in-focus state is obtained, the microcomputer 1 judges whether another focus area is in an in-focus range or in a range of a depth of field. During a manual focussing, the lens is not automatically driven and the microcomputer 1 judges only whether the focus area is in an in-focus state.

Reference numeral 7 represents a photometry circuit which measures light reflected from an object and supplies a photometric output to the microcomputer 1 under the control by the microcomputer 1. The microcomputer 1 converts the received photometric output into a digital signal which is used when the exposure conditions (aperture, shutter speed) are set. Reference numeral 8 represents a shutter control circuit which controls running of the leading and trailing shutter curtains in accordance with a control signal supplied from the microcomputer 1.

Reference numeral 9 represents a feeding and charging motors control circuit which performs film feeding (winding, rewinding) in accordance with a control signal supplied from the microcomputer 1. The motor control circuit 9 also controls an up/charge (mirror down) of the motor used for a quick return mirror.

A switch SW1 is used for starting a preliminary photographing operation of the camera. Upon detection of a turn-on of this switch SW1, the microcomputer 1 starts photometry/focus detection/display operations. A switch SW2 is used for starting a main photographing operation of the camera. Upon detection of the turning-on of this switch SW2, the microcomputer 1 starts an exposure operation. An X contact turns on at the timing when the leading shutter curtain completes its run, and informs the stroboscope emission control circuit 5 of a stroboscope emission timing. A switch SW3 is used for switching between camera modes (TV priority, AV priority, manual, program and the like).

Reference numeral 10 represents an electrical dial used for changing a TV value, an AV value, a mode, and the like. For example, as the electrical dial 10 is rotated while the mode switch SW3 is depressed, the mode is changed in the order of "TV priority"→"AV priority"→"manual"→"program"→"TV priority"→"AV priority"→"manual"→"program", . . . , so that a mode desired by the photographer can be set. As the electrical dial 10 is rotated in the opposite direction, the mode is changed in the order of "program"→"manual"→"AV priority"→"TV priority"→"program", . . . .

After the "TV priority" mode is set by using the mode switch SW3 and electrical dial 10, if the dial 10 only is rotated, a TV value desired by the photographer can be set. After the "AV priority" mode is set by using the mode switch SW3 and electrical dial 10, if the dial 10 only is rotated, an AV value desired by the photographer can be set.

A switch SW4 is used for setting an AV value during the manual mode. After the "manual" mode is set by using the mode switch SW3 and electrical dial 10, if the dial 10 only is rotated without depressing the AV value setting switch SW4, a TV value corresponding to the rotation is made up/down to set a desired TV value, or if the dial 10 is rotated while the switch SW4 is depressed, an AV value corresponding to the rotation is made up/down to set a desired AV value.

A switch SW5 is a focus detecting mode changing switch. For example, if the electrical dial 10 is rotated while the focus detecting mode changing switch SW5 is turned on, a focus area used for focus detection can be selected. By designating all focus areas, a focus area automatic mode can be set in which mode the camera automatically performs focus adjustment.

Reference numeral 11 represents an external display which is driven by the liquid crystal display circuit 3. Reference numeral 12 represents a finder liquid crystal display which is driven by the liquid crystal display circuit 3. Reference numeral 13 represents a replaceable taking lens which is controlled by the lens control circuit 2. Reference numeral 14 represents an external flash unit which is controlled by the stroboscope emission control circuit 5. The external flash unit 14 has its own power source independent from the camera power source. Reference numeral 15 represents a liquid crystal display disposed on the focussing screen. In this embodiment, the liquid crystal display 15 has forty five segments corresponding to forty five focus areas.

Figure 11A:
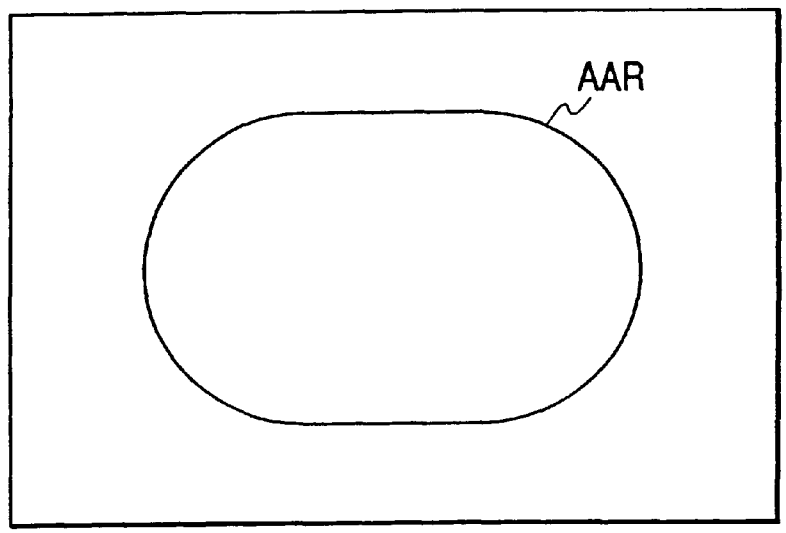
FIGS. 11A and 11B are diagrams illustrating focus areas of an auto focus camera and a display of in-focus states of the focus areas, according to fifth to seventh embodiments.
Figure 11B:
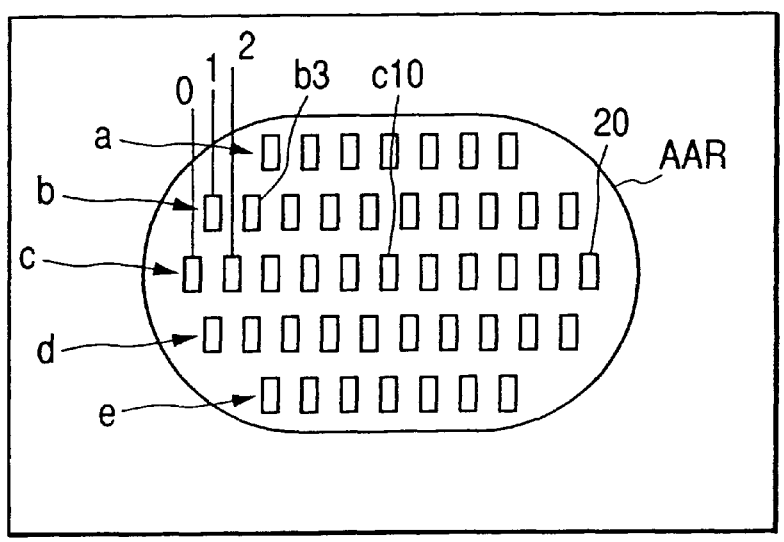

FIGS. 11A and 11B are diagrams illustrating a display in the finder.

FIG. 11A is a diagram before the focus state becomes in-focus and focus areas are not displayed. In FIG. 11A, AAR represents the whole focus area in which focus detection can be performed.

FIG. 11B is a diagram displaying all focus areas. Each focus area is identified by numbering a, b, c, d, and e from the highest row and 0, 1, 2, 3, . . . from the leftmost column. Namely, the highest row has focus areas a4, a6, a8, . . . , a16 from the left, the second row has focus areas b1, b3, b5, . . . , b19 from the left, the third row has focus areas c0, c2, c4, . . . , c20 from the left, the fourth row has focus areas d1, d3, d5, . . . , d19 from the left, and the lowest row has focus areas e4, e6, . . . , e16 from the left. With this notation, for example, the center focus area is represented by c10, and the focus area in the second row and at the second position from the left is represented by b3.

Figure 13:
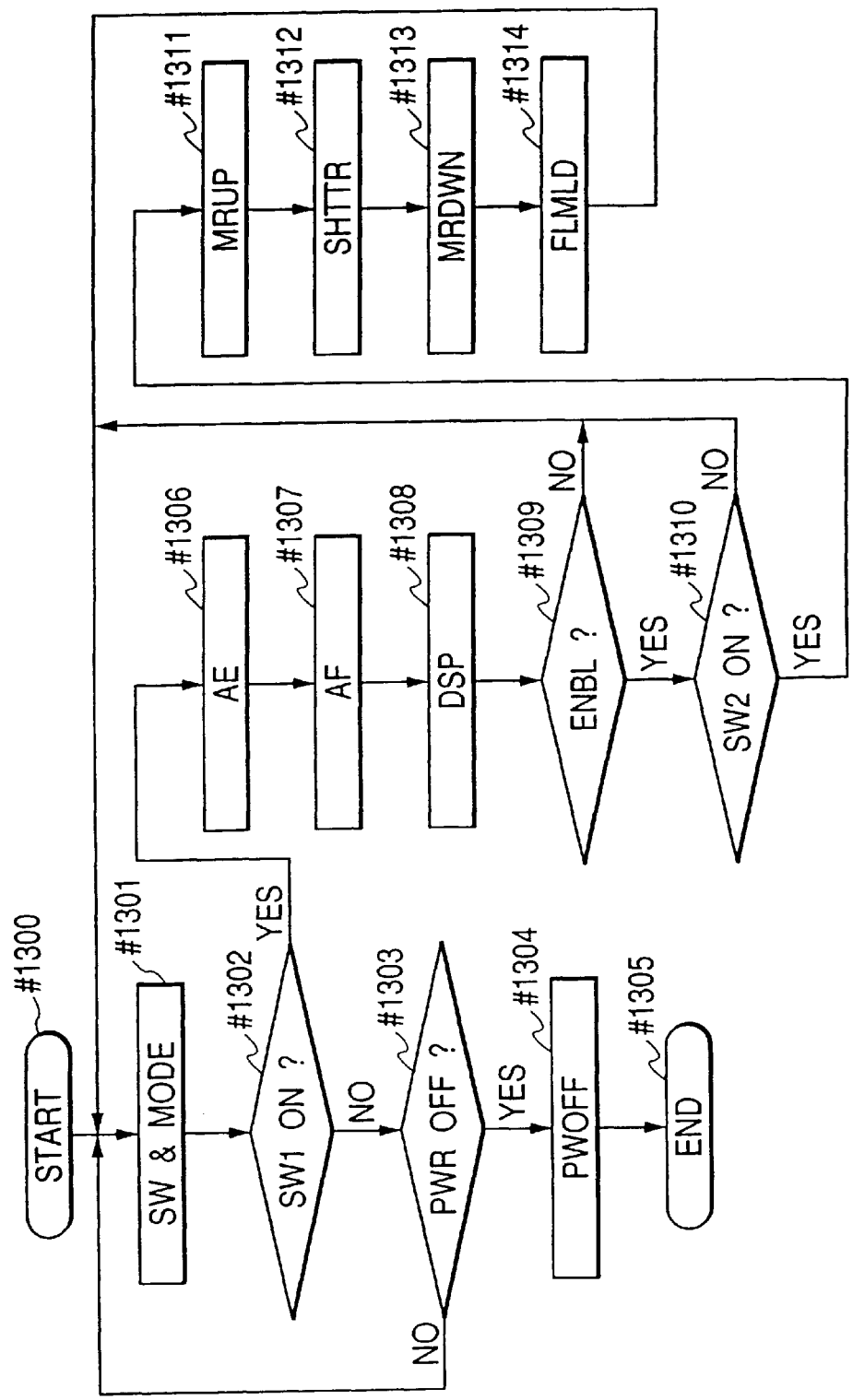
FIG. 13 is a flow chart illustrating the outline of a series of operations of the auto focus camera according to the fifth to seventh embodiment.

Next, the operation of the camera (microcomputer 1) will be described briefly with reference to the flow chart shown in FIG. 13.

At Step #1300 the power is supplied to the camera upon depression of a main switch of the camera. Next, at Step #1301 in accordance with information supplied from the switch sense circuit 4, a mode and a set value are switched. If there is any change, this change is supplied to the liquid crystal display circuit 3 to change display data and display color. At Step #1302 it is checked whether the switch SW1 is on. If on, photometry is performed at Step #1306, whereas if it is off, the flow advances to Step #1303 whereat it is checked whether the power source is to be turned on.

It is assumed herein that the switch SW1 is maintained off and the flow advances to Step #1303.

It is checked at Step #1303 whether the power is to be turned off. If the power is to be turned off, the flow advances to Step #1304, whereas if not, the flow returns to Step #1302 to check the switch SW1. Namely, after the power is turned on once, the power-on state is maintained for a predetermined period to check the switch state and change a display.

At Step #1304, the power is turned off to make the liquid crystal display circuit 3 erase unnecessary displays in the finder or on the outer frame of the camera. At Step #1305, a series of operations are terminated.

If it is judged at Step #1302 that the switch SW1 is on, the flow advances to Step #1306 whereat the photometry circuit 7 is activated to receive light reflected from an object and A/D convert it to acquire photometry information. In accordance with the photometry information, the exposure conditions (aperture, shutter speed) are calculated. At Step #1307, the focus detecting circuit 6 causes the photoelectric conversion sensor to accumulate charges in photoelectric conversion elements, stores the accumulated charges, and A/D converts the charges so that focus information in each of a plurality of focus areas can be calculated. In accordance with the calculated focus information, defocus amounts of a plurality of focus areas are calculated by using a known algorithm. In accordance with the focus detection result of a predetermined focus area, a lens drive amount is calculated and the lens driving amount is supplied to the lens control circuit 2 to drive the lens in an in-focus state.

At Step #1308, the liquid crystal display circuit 3 displays an AV value and a TV value calculated at Step #1306 on the finder liquid crystal display 12 and external liquid crystal display 11. The focus detection result of each focus area (and whether the focus area in a defocus state is in a range of the depth of field) obtained at Step #1307 is displayed on the liquid crystal display 15 (the details will be given later). At Step #1309 it is checked whether the camera state permits a release. For example, if the AF mode is a "one shot mode" and a focus detection result at Step #1307 is in-focus state, then the release is permitted to follow Step #1310 to check the switch SW2, whereas if it is not in an in-focus state, the flow returns to Step #1301.

After the flow returns to Step #1301, similar to the above description, a mode and the like are displayed if necessary and the flow advances to Step #1302 to check the switch SW1. If the switch SW1 is on, photometry, focus detection, and display are again performed (Steps #1302, #1306, #1307, and #1308), and at Step #1309 it is checked again whether the camera state permits a release.

At Step #1310 it is checked whether the switch SW2 is on. If it is on, the flow advances to Step #1311 to start a photographing operation, whereas if it is off, the flow returns to Steps #1301 and #1302 to check the switch SW1. If it is judged at Step #1302 that the switch SW1 is on, photometry, focus detection, and display are again performed.

At Step #1311 the feeding and charging motors control circuit 9 moves up a quick return mirror, and the lens driving circuit 2 supplies the aperture amount determined at Step #1306 to the taking lens 13 to stop down the aperture so as to have a predetermined exposure amount. At Step #1312 the shutter control circuit 8 controls the movement of the leading and trailing shutter curtains so as to obtain the TV amount determined at Step #1306. At Step #1313, the feeding and charging motors control circuit 9 moves down the quick return mirror and at the same time charges the shutter to open the aperture which was stopped down at Step #1306. At Step #1314 the feeding and charging motors control circuit 9 controls the feeding motor to wind up the film.

A series of operations of the camera are completed as in the above manner.

Figure 14B:
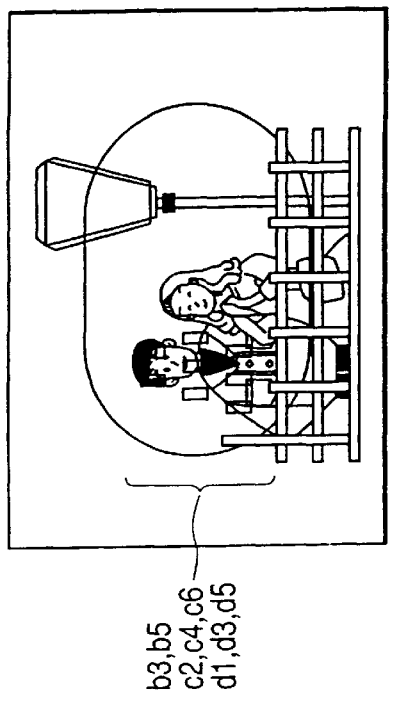
FIGS. 14A, 14B, 14C and 14D are diagrams illustrating focus areas of an auto focus camera and a display of in-focus states of the focus areas, according to the fifth embodiment.

Next, with reference to FIGS. 14A and 14B, a display in the finder will be described.

Figure 14A:
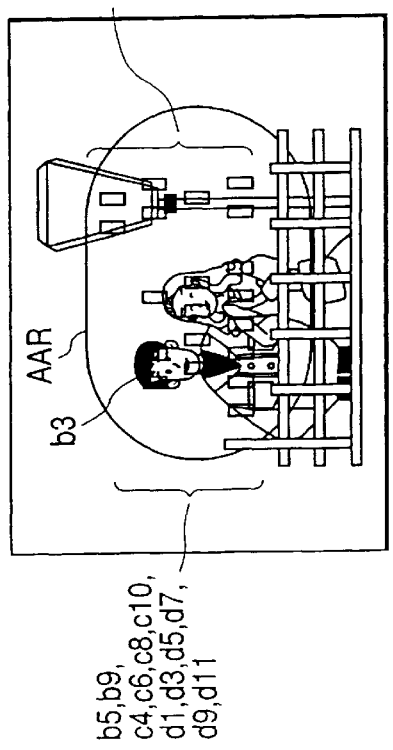

FIG. 14A shows an example of a scene to be automatically focussed. First, focus detection is performed in the whole focus area ARR and the focus area b3 is designated as the focus adjustment focus area by using a predetermined algorithm. The focus is adjusted relative to this focus area b3. After the focus adjustment, in addition to the focus area b3, the focus areas in an in-focus state include b5, b9, c4, c6, c8, c10, d1, d3, d5, d7, d9, d11, a14, a16, b15, b17, c16, d15, and d17.

Figure 14D:
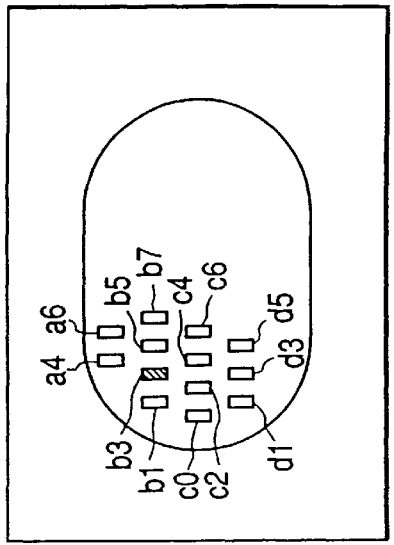
Figure 14C:
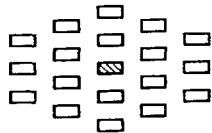

FIG. 14C is a diagram illustrating a predetermined area. The focus adjustment is performed relative to the center focus area (indicated by a solid black area). Focus areas having a predetermined positional relation to the center focus area are those on two circumference areas surrounding the center focus area. Detecting results in the above predetermined areas are only displayed. The focus areas to be displayed in an in-focus state in the case that the focus adjustment is only performed in the focus area b3, as shown in FIG. 14D, are those two areas surrounding the focus area b3, each of which has the predetermined positional relation, i.e., a4, a6, b1, b3, b5, b7, c0, c2, c4, c6, d1, d3, and d5. Of these, the focus areas in the in-focus state are eight areas including b3, b5, c2, c4, c6, d1, d3, and d5. These areas displayed in the in-focus state are shown in FIG. 14B.

With such a display in the in-focus state, the photographer can confirm that the left person was focussed, and the in-focus state display for unnecessary areas can be avoided so that photographing is not hindered. Since a display in the in-focus state is not given to the street lamp, there is no fear that the photographer recognizes an erroneous focus detection.

Sixth Embodiment

Next, the sixth embodiment will be described. The electrical configuration of the camera of this embodiment is similar to that shown in FIG. 12, the finder display is also the same as FIGS. 11A and 11B, and the operation of the camera is the same as given in the flow chart shown in FIG. 13. Therefore, the description thereof is omitted.

The sixth embodiment will be described by using the scene shown in FIG. 14A.

Similar to the fifth embodiment, after the focus adjustment is performed in the focus area b3, in addition to the focus area b3, the focus areas in an in-focus state include b5, b9, c4, c6, c8, c10, d1, d3, d5, d7, d9, d11, a14, a16, b15, b17, c16, d15, and d17.

Figure 15C:
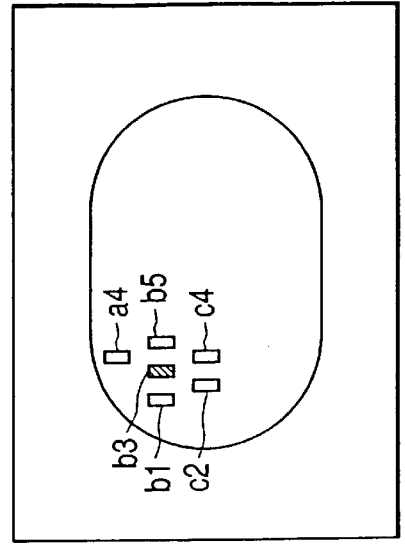
FIGS. 15A, 15B and 15C are diagrams illustrating focus areas of an auto focus camera and a display of in-focus states of the focus areas, according to the sixth embodiment.
Figure 15A:
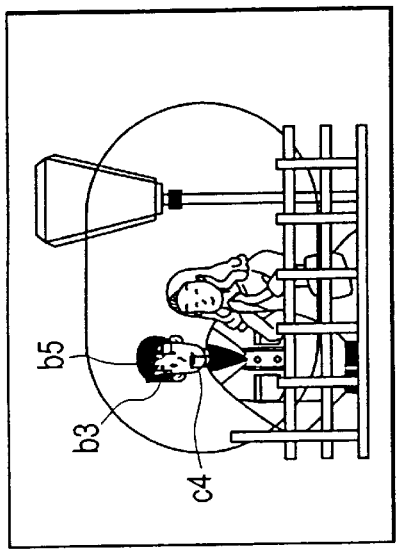
Figure 15B:
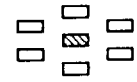

FIG. 15B is a diagram illustrating a predetermined area of the sixth embodiment. The focus adjustment is performed relative to the center focus area indicated by a solid black area. Focus areas having a predetermined positional relation to the center focus area are those on one circumference area surrounding the center focus area. The focus areas in the in-focus state in this predetermined area are displayed.

FIG. 15C shows the adjacent focus areas after the focus adjustment of the focus area b3. As seen from FIG. 15C, there are six adjacent focus areas a4, b1, b5, c2, and c4 including b3. Of these focus areas, if those are in the in-focus state, display is performed. The focus areas in the in-focus state in this area are those b3, b5 and c4 which are displayed as shown in FIG. 15A.

With such a display in the in-focus state, the photographer can confirm that the left person was focussed, and in the in-focus state display for unnecessary areas can be avoided so that photographing is not hindered. There is no fear that the photographer recognizes an erroneous distance measurement (erroneous focus detection).

Figure 16A:
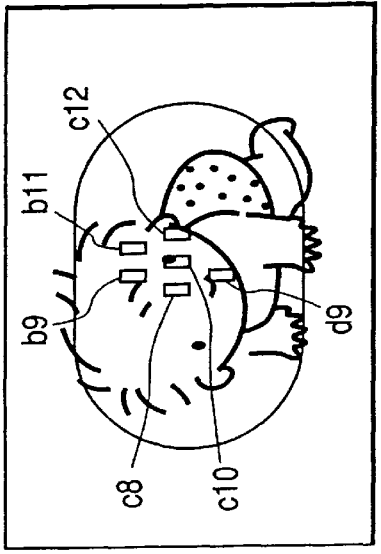
FIGS. 16A, 16B and 16C are diagrams illustrating focus areas of an auto focus camera and a display of in-focus states of the focus areas, according to the sixth embodiment.

The finer display of the sixth embodiment will be further described by using the scene shown in FIG. 16A.

Figure 16B:
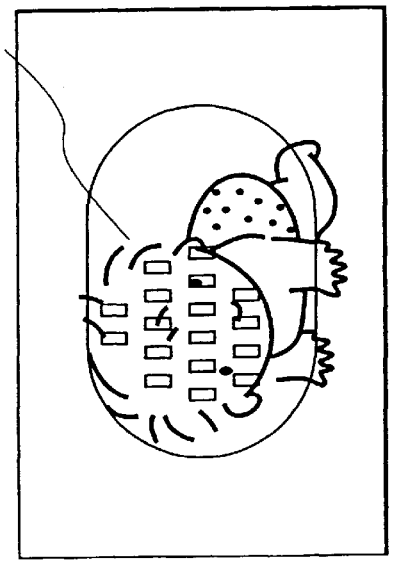
Figure 16C:
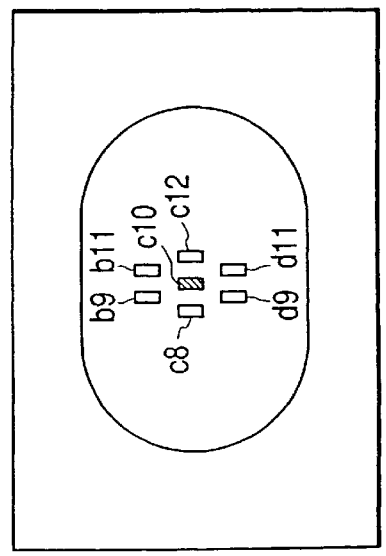

FIG. 16A shows an example of a scene to be automatically focussed. First, focus detection is performed in the whole focus area ARR and the focus area c10 is designated as the focus adjustment focus area by using a predetermined algorithm. The focus is adjusted relative to this focus area c10. After the focus adjustment, the focus areas in the in-focus state include a6, a8, b3, b5, b7, b9, b11, c2, c4, c6, c8, c10, c12, d3, d5, d7, and d9. By applying the predetermined area shown in FIG. 15B to this scene, there are seven focus areas to be displayed in the in-focus state, including b9, b11, c8, c10, c12, d9, and d11 as shown in FIG. 16C. Of these, those in the in-focus state are b9, b11, c8, c10, c12, and d9. Therefore, as shown in FIG. 16B, these six focus areas are displayed.

If all the focus areas in the in-focus state are displayed, it is not easy to visually confirm the main object and the photographing is hindered. However, as in this embodiment, if the focus area used for focus adjustment and the adjacent in-focus areas are displayed, it is easy to confirm that the left eye of a baby was focussed. Unnecessary focus areas are not displayed so that the photographing is not hindered by a difficulty in viewing the baby's face.

Seventh Embodiment

Next, the seventh embodiment will be described. The electrical configuration of the camera of this embodiment is similar to that shown in FIG. 12, the finder display is also the same as FIGS. 11A and 11B, and the operation of the camera is the same as given in the flow chart shown in FIG. 13. Therefore, the description thereof is omitted.

Figure 17D:
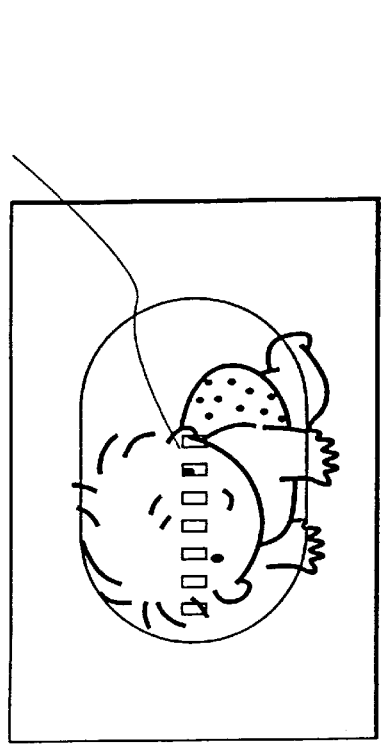
Figure 17D:
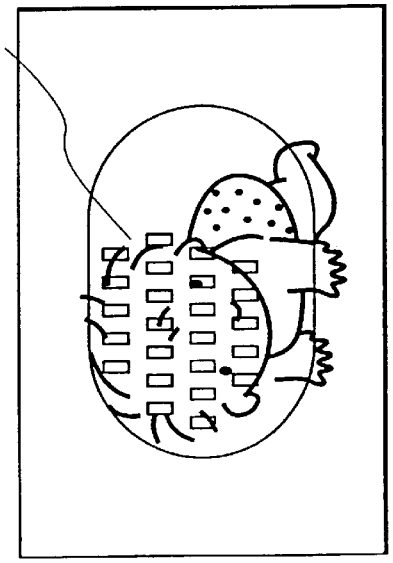
Figure 17D:
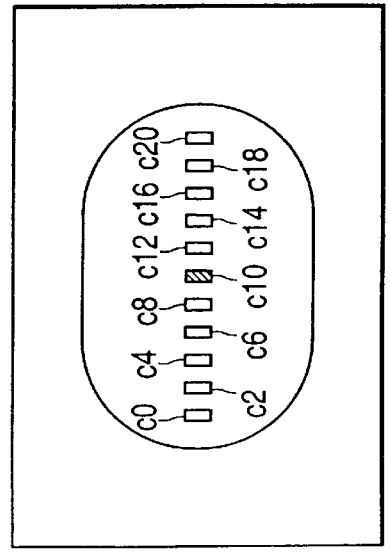
Figure 17C:
Figure 18B:
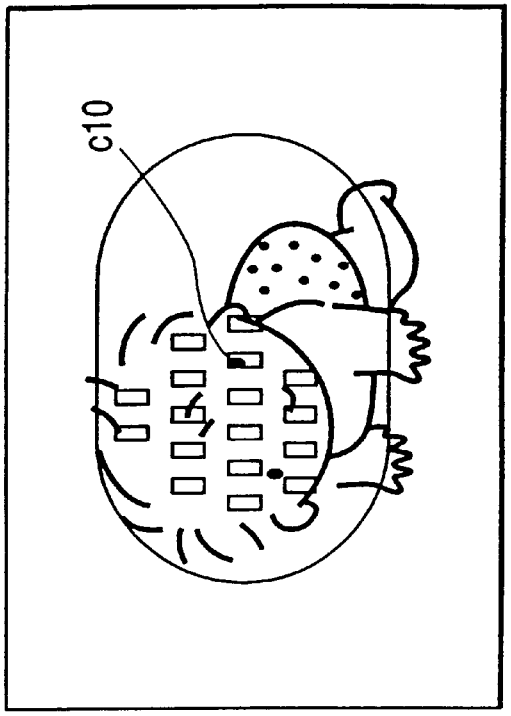
FIGS. 18A and 18B are diagrams illustrating focus areas of a coventional auto focus camera and a display of in-focus states of the focus areas.
Figure 18A:
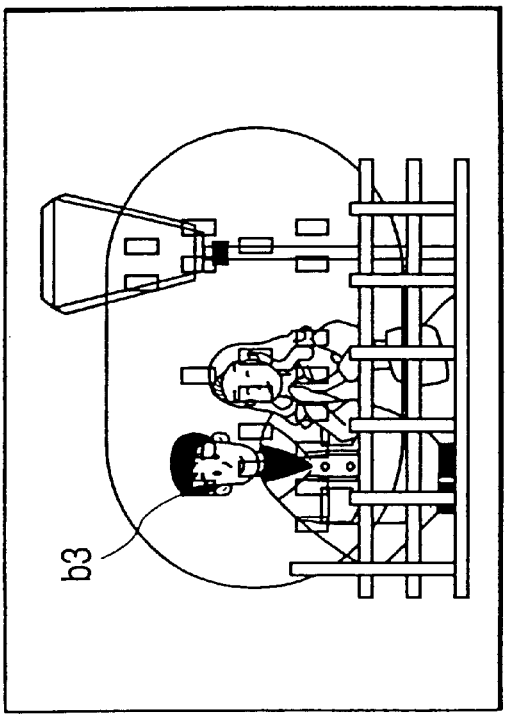

The seventh embodiment will be described by using the scene shown in FIG. 16A. Similar to the sixth embodiment, after the focus adjustment is performed in the focus area c10, the focus areas in the in-focus state include a6, a8, b3, b5, b7, b9, b11, c2, c4, c6, c8, c10, c12, d3, d5, d7, and d9. FIG. 17A is a diagram showing a range in the depth of field of this scene. In addition to the in-focus areas a6, a8, b3, b5, b7, b9, b11, c2, c4, c6, c8, c10, c12, d3, d5, d7, and d9, the focus areas a4, a10, a12, b1, b13, c0, and d11 are in a range of the depth of field. FIG. 17C is a diagram showing a predetermined area of the seventh embodiment.

In this embodiment, the predetermined area is defined by the focus area used for focus adjustment and by those areas disposed in line along the focus adjustment focus area. FIG. 17C shows the predetermined area after the focus adjustment of the focus area c10.

As seen from FIG. 17C, the focus areas c0, c2, c4, c6, c8, c10, c12, c14, c16, c18, and c20 are displayed if they are in a range of the depth of field. The focus areas in the in-focus state in this area are those c2, c4, c6, c8, and c10, and the focus area c0 is in a range of the depth of field of the scene. Therefore, six focus areas in total are displayed.

As above, the focus area used for focus adjustment, the focus areas having the predetermined position relation, and the focus areas in a range of the depth of field are displayed. Therefore, it is possible to confirm that the baby's face is in the range of the depth of field. Unnecessary focus areas are not displayed so that the photograph is not hindered by a difficulty in viewing the baby's face.

What is claimed is:

1. An optical apparatus having a focus adjusting function, comprising:

a) focus detecting means for executing a focus detection operation for each of a plurality of focus areas set in an image plane;

b) grouping means for grouping the image plane in accordance with a distribution of defocus amounts or distances obtained from focus detection results of the plurality of focus areas by said focus detecting means;

c) focus area selecting means for selecting at least one focus area from the plurality of focus areas in accordance with a grouping result by said grouping means;

d) defocus amount comparing means for comparing a defocus amount of the focus area selected by said focus area selecting means with a predetermined defocus amount;

e) lens driving means for driving a lens until the selected focus area is made in-focus, if a comparison result by said defocus amount comparing means shows that the defocus amount of the selected focus area is smaller than the predetermined defocus amount; and f) focus area re-selecting means for re-selecting a focus area by driving the lens in accordance with the defocus amount of the selected focus area and thereafter again operating said focus detecting means, said grouping means, and said focus area selecting means, if a comparison result by said defocus amount comparing means shows that the defocus amount of the selected focus area is larger than the predetermined defocus amount.

2. An optical apparatus having a focus adjusting function, comprising:

a) focus detecting means for executing a focus detection operation for each of a plurality of focus areas set in an image plane;

b) grouping means for grouping the image plane in accordance with a distribution of defocus amounts or distances obtained from focus detection results of the plurality of focus areas by said focus detecting means;

c) focus area selecting means for selecting at least one focus area from the plurality of focus areas in accordance with a grouping result by said grouping means;

d) defocus amount comparing means for comparing a defocus amount of the focus area selected by said focus area selecting means with a predetermined defocus amount;

e) lens driving means for driving a lens until the selected focus area is made in-focus, if a comparison result by said defocus amount comparing means shows that the defocus amount of the selected focus area is smaller than the predetermined defocus amount; and f) focus area re-selecting means for re-selecting at least one focus area from the plurality of focus areas by driving the lens in accordance with the defocus amount of the selected focus area and thereafter again referring to a grouping result by said grouping means, if a comparison result by said defocus amount comparing means shows that the defocus amount of the selected focus area is larger than the predetermined defocus amount.

3. An optical apparatus having a focus adjusting function, comprising:

a) focus detecting means for executing a focus detection operation for each of a plurality of focus areas set in an image plane;

b) focus area selecting means for selecting at least one focus area from the plurality of focus areas;

c) defocus amount comparing means for comparing a defocus amount of the focus area selected by said focus area selecting means with a predetermined defocus amount;

d) lens driving means for driving a lens until the selected focus area is made in-focus, if a comparison result by said defocus amount comparing means shows that the defocus amount of the selected focus area is smaller than the predetermined defocus amount; and e) focus area re-selecting means for re-selecting at least one focus area from the plurality of focus areas after driving the lens in accordance with the defocus amount of the selected focus area, if a comparison result by said defocus amount comparing means shows that the defocus amount of the selected focus area is larger than the predetermined defocus amount.

4. A focus adjustment control circuit comprising:

a) focus detecting means for executing a focus detection operation for each of a plurality of focus areas set in an image plane;

b) grouping means for grouping the image plane in accordance with a distribution of defocus amounts or distances obtained from focus detection results of the plurality of focus areas by said focus detecting means;

c) focus area selecting means for selecting at least one focus area from the plurality of focus areas in accordance with a grouping result by said grouping means;

d) defocus amount comparing means for comparing a defocus amount of the focus area selected by said focus area selecting means with a predetermined defocus amount;

e) lens driving signal outputting means for outputting a signal which drives a lens until the selected focus area is made in-focus, if a comparison result by said defocus amount comparing means shows that the defocus amount of the selected focus area is smaller than the predetermined defocus amount; and f) focus area re-selecting means for re-selecting a focus area by outputting a signal which drives the lens in accordance with the defocus amount of the selected focus area and thereafter again operating said focus detecting means, said grouping means, and said focus area selecting means, if a comparison result by said defocus amount comparing means shows that the defocus amount of the selected focus area is larger than the predetermined defocus amount.

5. A focus adjustment control circuit comprising:

a) focus detecting means for executing a focus detection operation for each of a plurality of focus areas set in an image plane;

b) grouping means for grouping the image plane in accordance with a distribution of defocus amounts or distances obtained from focus detection results of the plurality of focus areas by said focus detecting means;

c) focus area selecting means for selecting at least one focus area from the plurality of focus areas in accordance with a grouping result by said grouping means;

d) defocus amount comparing means for comparing a defocus amount of the focus area selected by said focus area selecting means with a predetermined defocus amount;

e) lens driving signal outputting means for outputting a signal which drives a lens until the selected focus area is made in-focus, if a comparison result by said defocus amount comparing means shows that the defocus amount of the selected focus area is smaller than the predetermined defocus amount; and f) focus area re-selecting means for re-selecting at least one focus area from the plurality of focus areas by outputting a signal which drives the lens in accordance with the defocus amount of the selected focus area and thereafter again referring to a grouping result by said grouping means, if a comparison result by said defocus amount comparing means shows that the defocus amount of the selected focus area is larger than the predetermined defocus amount.

6. A focus adjustment control circuit comprising:

a) focus detecting means for executing a focus detection operation for each of a plurality of focus areas set in an image plane;

b) focus area selecting means for selecting at least one focus area from the plurality of focus areas;

c) defocus amount comparing means for comparing a defocus amount of the focus area selected by said focus area selecting means with a predetermined defocus amount;

d) lens driving signal outputting means for outputting a signal which drives a lens until the selected focus area is made in-focus, if a comparison result by said defocus amount comparing means shows that the defocus amount of the selected focus area is smaller than the predetermined defocus amount; and e) focus area re-selecting means for re-selecting at least one focus area from the plurality of focus areas after outputting a signal which drives the lens in accordance with the defocus amount of the selected focus area, if a comparison result by said defocus amount comparing means shows that the defocus amount of the selected focus area is larger than the predetermined defocus amount.

* * * * *